Aug. 28, 1923.

C. S. KELLUM 1,466,019

ELECTRIC GAUGE

Filed June 6, 1918

Witness
Chas. W. Stauffer
Karl H. Butler

Inventor
Charles S. Kellum,
By
Attorneys

Patented Aug. 28, 1923.

1,466,019

UNITED STATES PATENT OFFICE.

CHARLES S. KELLUM, OF DETROIT, MICHIGAN.

ELECTRIC GAUGE.

Application filed June 6, 1918. Serial No. 238,459.

*To all whom it may concern:*

Be it known that I, CHARLES S. KELLUM, a citizen of the United States of America, residing at Detroit, in the county of Wayne and State of Michigan, have invented certain new and useful Improvements in Electric Gauges, of which the following is a specification, reference being had therein to the accompanying drawings.

This invention relates to an electric gauge, and has special reference to electromechanical means for indicating the volume of liquid in a tank, and more particularly the fuel tank of an automobile or similar vehicle, located at a point remote from dash or operator's seat of the vehicle.

The primary object of my invention is to provide a float or mechanically operated rheostat or electrical device, which in conjunction with a suitable source of electrical energy, is adapted to actuate a voltameter, ammeter or similar device to indicate the volume of fuel in a tank in which the float or mechanical operating means of the rheostat is located.

A further object of this invention is to provide a resistance embodying a homogeneous mass affording a resistance of low degree, in contradistinction to a plurality of separate contact members, and movable over the mass is a contact member by which a desired degree of resistance can be obtained for an electric circuit, the intimate relation between the mass and the contact member being such that the minute adjustment of the contact member will positively cause a difference in resistance, such being in contradistinction to a movable contact member being shifted between separate resistance contact members.

Figure 1:
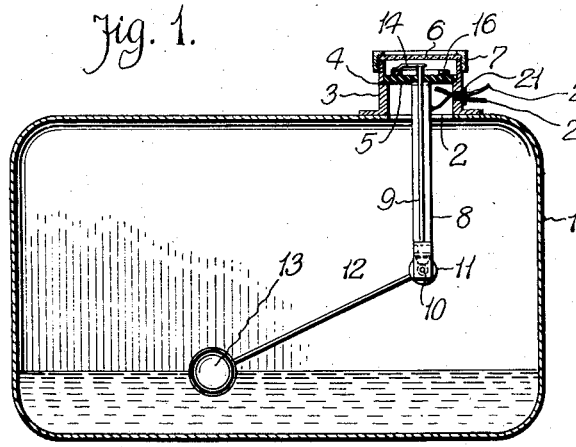
Figure 2:
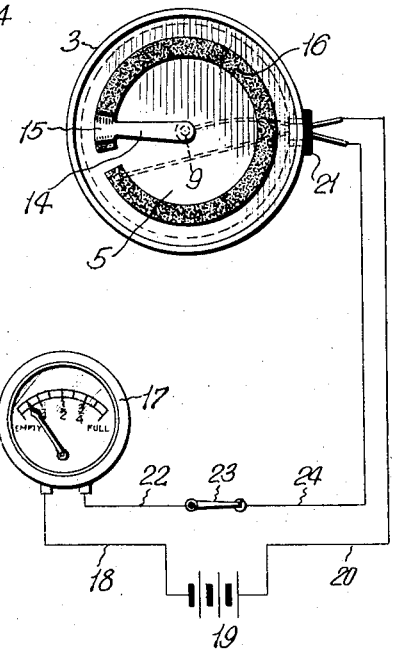

The above are a few of the objects that may be attained by a gauge which will be hereinafter described and then claimed, and reference will now be had to the drawings, wherein Figure 1 is a longitudinal sectional view of a fuel tank equipped with a float or mechanically operated rheostat, and Fig. 2 is a plan of the rheostat associated with a suitable source of electrical energy and an electrical indicating device, as a voltameter or ammeter.

Reference will first be had to Figs. 1 and 2, wherein the reference numeral 1 denotes a fuel tank or receptacle adapted to contain gasoline or kerosene, said tank being of a type usually carried at the rear end of an automobile or at some point remote from the dash or driver's seat.

The top of the tank 1 is provided with an opening 2, and suitably secured to the top of the tank, about the opening 2, is a cylindrical or tubular rheostat support 3 having an annular interior shoulder 4 adapted to support a disk or body of insulation material 5. The rheostat support 3 is exteriorly screwthreaded to receive an apertured cap 7, adapted for retaining a transparent plate 6 on the upper end of the rheostat support 3, and in spaced relation to the body of insulation 5.

Connected to the lower side of the body of insulation 5 and extending through the opening 2 of the tank 1 is a hanger or bracket 8 supporting a revoluble, vertical shaft 9 and a horizontal float shaft 10, said shafts having beveled gear wheels 11 so that a rocking movement of the float shaft 10 will impart movement to the vertical shaft 9. The float shaft 10, has an arm 12 provided with a conventional form of float 13, said float being hollow or of sufficient buoyancy to be raised and lowered by the admission and withdrawal of fuel to and from the tank 1.

The upper end of the shaft 9 extends through the body of insulation 5 and has a radially disposed crank or arm 14 provided with a contact member 15 adapted to frictionally engage a circumferentially disposed resister 16, which may be in the form of metal, carbon, or any material which will afford a variable electric resistance in proportion to its density or volume.

The reference numeral 17 denotes a voltameter, ammeter or electrical indicating device adapted to be located on the dash of an automobile, or at some convenient place where the same may be readily observed by the operator. The electrical device 17 is connected by a wire 18 to a suitable source of electrical energy, as a battery 19, and said battery is connected by a wire 20 to the crank or arm 14 of the vertical shaft 9, said wire extending through an insulator 21 carried by the gauge support 3.

The electrical device 17 is also connected by a wire 22 to a conventional form of switch 23, and said switch by a wire 24 to one end of the resister 16, the wire 24 extending through the insulator 21, and through the body of insulation 5.

The electrical device 17 is adapted to indicate when the tank 1 is empty or full or the volume of fuel within the tank, according to the manner in which the dial of the electrical device is graduated. As shown, a high degree of resistance may indicate that the tank is about empty and when the tank is filled, the crank arm 14 will be swung around to the opposite end of the resister thereby cutting out the greater part of the same and establishing a low resistance circuit which will cause the electrical device 17 to indicate that the tank is full. This may be reversed if desired, that is, have a low degree of resistance indicate that the tank is full and a high resistance indicate that the tank is empty. In either instance, the operator or chauffeur of an automobile can determine by observation the amount of fuel in the tank, thus obviating the necessity of leaving the driver's seat to observe the condition of the fuel tank.

What I claim is:—

In an electric gauge, a resistance embodying a homogeneous mass providing a continuous uninterrupted flat contact face in which the molecular constituents may afford a resistance of the lowest degree, and means movable on the face of the mass and having a constant intimate bearing on the face of the mass so that the least possible movement of said means produces a resistance differing from the resistance provided by the original position of said means.

In testimony whereof I affix my signature in the presence of two witnesses.

CHARLES S. KELLUM.

Witnesses:
KARL H. BUTLER,
ANNA M. DORR.